US009931893B2

(12) United States Patent
Nomura

(10) Patent No.: US 9,931,893 B2
(45) Date of Patent: Apr. 3, 2018

(54) PNEUMATIC TIRE

(71) Applicant: BRIDGESTONE CORPORATION, Tokyo (JP)

(72) Inventor: Tsutomu Nomura, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 371 days.

(21) Appl. No.: 14/759,036

(22) PCT Filed: Jan. 30, 2014

(86) PCT No.: PCT/JP2014/000501
§ 371 (c)(1),
(2) Date: Jul. 2, 2015

(87) PCT Pub. No.: WO2014/119325

PCT Pub. Date: Aug. 7, 2014

(65) Prior Publication Data
US 2015/0352906 A1 Dec. 10, 2015

(30) Foreign Application Priority Data

Jan. 30, 2013 (JP) .................................. 2013-016198

(51) Int. Cl.
*B60C 11/11* (2006.01)
*B60C 11/13* (2006.01)
(Continued)

(52) U.S. Cl.
CPC ............... *B60C 11/13* (2013.01); *B60C 5/00* (2013.01); *B60C 11/0311* (2013.01);
(Continued)

(58) Field of Classification Search
CPC ............. B60C 11/0311; B60C 11/0316; B60C 11/0306; B60C 11/12; B60C 11/1369;
(Continued)

(56) References Cited

U.S. PATENT DOCUMENTS

2010/0006197 A1 1/2010 Kuroishi et al.
2010/0163146 A1* 7/2010 Bodin ................. B60C 11/0311
152/209.9
(Continued)

FOREIGN PATENT DOCUMENTS

CN 102887039 A 1/2013
EP 2060413 A1 5/2009
(Continued)

OTHER PUBLICATIONS

Machine translation for Japan 2012-179948 (no date).*
(Continued)

*Primary Examiner* — Steven D Maki
(74) *Attorney, Agent, or Firm* — Oliff PLC

(57) ABSTRACT

A pneumatic tire, including: a lug groove opening at an end of a ground contact surface of a tread portion and extending toward the tire equatorial plane of the ground contact surface to terminate before reaching the tire equatorial plane; a communication groove making a corresponding pair of the lug grooves located on respective sides of the tire equatorial plane communicate with each other; and at least one widthwise groove, formed in a ground contact surface region demarcated between the end of the ground contact surface and the tire equatorial plane and between one pair and another pair adjacent thereto in the tread circumferential direction of the lug grooves and the communication groove communicating therewith, such that the widthwise groove extends in a direction of a tread width and an end thereof on the outer side in the tread width direction terminates within the ground contact surface region.

8 Claims, 8 Drawing Sheets

(51) Int. Cl.
*B60C 5/00* (2006.01)
*B60C 11/12* (2006.01)
*B60C 11/03* (2006.01)

(52) U.S. Cl.
CPC ...... *B60C 11/0316* (2013.01); *B60C 11/1263* (2013.01); *B60C 11/1369* (2013.01); *B60C 2011/036* (2013.01); *B60C 2011/0313* (2013.01); *B60C 2011/0344* (2013.01); *B60C 2011/0348* (2013.01); *B60C 2011/0369* (2013.01); *B60C 2011/0381* (2013.01); *B60C 2200/06* (2013.01); *B60C 2200/065* (2013.01)

(58) Field of Classification Search
CPC ....... B60C 2011/0313; B60C 2200/065; B60C 2011/0381; B60C 2011/0383; B60C 2011/036; B60C 2011/0369; B60C 2011/0348
See application file for complete search history.

(56) References Cited

U.S. PATENT DOCUMENTS

| | | | | |
|---|---|---|---|---|
| 2012/0118461 | A1* | 5/2012 | Matsuzawa | B60C 11/0311 152/209.18 |
| 2015/0007918 | A1* | 1/2015 | Hironaka | B60C 11/0316 152/209.16 |
| 2015/0352906 | A1 | 12/2015 | Nomura | |

FOREIGN PATENT DOCUMENTS

| | | |
|---|---|---|
| EP | 2248684 A1 | 11/2010 |
| EP | 2248685 A1 | 11/2010 |
| EP | 2 952 364 A1 | 12/2015 |
| JP | S59-209903 A | 11/1984 |
| JP | 62-122804 A * | 6/1987 |
| JP | H03-253410 A | 11/1991 |
| JP | H06-199110 A | 7/1994 |
| JP | H10-230712 A | 9/1998 |
| JP | 2007-191093 A | 8/2007 |
| JP | 2008-013037 A | 1/2008 |
| JP | 2008-062706 A | 3/2008 |
| JP | 2008-126943 A | 6/2008 |
| JP | 2011-152836 A | 8/2011 |
| JP | 2012-179948 A | 9/2012 |
| JP | 2012-179948 A * | 9/2012 |
| WO | 2008029563 A1 | 3/2008 |
| WO | 2009096133 A1 | 8/2009 |
| WO | 2010/018081 A1 | 2/2010 |
| WO | WO-2013/125246 A1 * | 8/2013 |
| WO | 2014/119325 A1 | 8/2014 |

OTHER PUBLICATIONS

Machine translation for Japan 62-122804 (no date).*
Mar. 18, 2014 Office Action issued in Japanese Application No. 2013-016198.
Aug. 19, 2014 Office Action issued in Japanese Application No. 2013-016198.
Apr. 1, 2014 International Search Report issued in International Application No. PCT/JP2014/000501.
Nov. 3, 2015 Office Action issued in Australian Patent Application No. 2014212937.

* cited by examiner

PNEUMATIC TIRE

TECHNICAL FIELD

The present invention relates to a pneumatic tire having: lug grooves each opening at an end of a ground contact surface of a tread and extending toward the tire equatorial plane of the ground contact surface to terminate before reaching the tire equatorial plane; and communication grooves each making a corresponding pair of lug grooves located on respective sides of the tire equatorial plane communicate with each other.

BACKGROUND ART

In a pneumatic tire for a construction vehicle, mounted on a construction vehicle or the like such as a dump truck for use in a construction site or a mine, tire wear life thereof is generally prolonged, i.e. wear resistance thereof is improved, by increasing a volume of tread rubber and/or reducing an area of groove portions formed in a ground contact surface of a tread portion thereof. However, the tire of this kind having a large volume of tread rubber of itself inevitably experiences an increase in temperature at the interior of the tread portion and thus thermal degradation of rubber by the increase in volume of tread rubber and/or the decrease in groove area in the ground contact surface of the tread, which may eventually cause troubles in the tire.

In view of this, there has been developed for such a tire as described above a technique of suppressing an increase in temperature of a tread portion, with maintaining high wear resistance at a ground contact surface of the tread portion, as disclosed in PTL 1. However, further suppression of an increase in temperature of a tread portion is demanded in recent years because such a tire as described above is increasingly used for a construction vehicle or the like which runs at higher speed.

CITATION LIST

Patent Literature

PTL 1: JP2008-013037

SUMMARY

It is known that a rate of temperature rise at the interior of a tread portion gradually increases in the tread width direction from each tread shoulder side toward the tire equatorial plane and is especially high in the central region other than the respective side regions of the tread portion. Suppression of temperature increase in the central region of a tread portion is therefore effective in terms of preventing troubles from occurring in a tire due to temperature increase in a tread portion thereof.

Based on such findings as described above, a center circumferential groove is conventionally formed in a ground contact surface of a tread to continuously extend in the tread circumferential direction on the tire equatorial plane. However, in a case where such a center circumferential groove is formed, there is still a problem in that the center circumferential groove alone cannot dissipate heat accumulated in the central region of the tread in a satisfactory manner all across the central region, although the center circumferential groove somehow ensures a heat-dissipating area in a ground contact surface of a tread in the vicinity of the tire equatorial plane exhibiting a highest temperature increase rate in the tread width direction and effectively suppresses a temperature rise only in the area.

The present disclosure aims at solving the aforementioned problem that a pneumatic tire having a relatively large volume of tread rubber tends to have a high rate of temperature rise at the interior of a tread portion by improving a tread pattern formed in a ground contact surface of the tread portion. Specifically, an object of the present disclosure is to provide a pneumatic tire capable of reducing a temperature rise hi the central region, generating a large amount of heat, of a tread portion thereof satisfactorily low all across the central region.

Our pneumatic tire, comprises: a lug groove opening at an end of a ground contact surface of a tread portion and extending toward the tire equatorial plane of the ground contact surface of the tread portion to terminate before reaching the tire equatorial plane; a communication groove making a corresponding pair of the lug grooves located on respective sides of the tire equatorial plane communicate with each other; and at least one widthwise groove, formed in a ground contact surface region demarcated between the end of the ground contact surface and the tire equatorial plane and between one pair and another pair adjacent thereto in the tread circumferential direction of the lug grooves and the communication groove communicating therewith, such that the widthwise groove extends in a direction of a tread width and an end thereof on the outer side in the tread width direction terminates within the ground contact surface region.

The aforementioned expression that "an end thereof on the outer side in the tread width direction terminates within the ground contact surface region" represents that an end on the outer side in the tread width direction of the widthwise groove opens at none of the lug groove, the communication groove and the end of the ground contact surface of the tread portion.

In the aforementioned disclosure, a "ground contact surface of a tread portion" represents an outer circumferential surface over the entire circumference of a tire, which surface is brought into contact with a road surface when the tire assembled with a prescribed rim and inflated at the normal internal pressure is rotated with the load corresponding to the maximum loading capacity exerted thereon. An "end of a ground contact surface of a tread portion" represents the outermost position in the tire width direction of the ground contact surface of the tread portion.

In the aforementioned disclosure, a "prescribed rim" represents a rim prescribed for each tire size by industrial standards described below. The "normal internal pressure" represents internal air pressure prescribed to correspond to the maximum loading capacity of a tire by the industrial standards. "The maximum loading capacity" represents the maximum mass which may be loaded on a tire and is prescribed according to the tire by the industrial standards. The industrial standards making the aforementioned prescriptions are each valid in an area where the tire is manufactured and used, and examples of the industrial standards include: "Year Book" of "THE TIRE AND RIM ASSOCIATION INC." (TRA) of the United States; "STANDARDS MANUAL" of "The European Tyre and Rim Technical Organisation" of Europe; and "JATMA YEAR BOOK" of "The Japan Automobile Tyre Manufacturers Association, Inc." of Japan.

It is preferable that our pneumatic tire further comprises in the ground contact surface of the tread portion a center circumferential groove continuously extending in the tread circumferential direction on the tire equatorial plane and communicating with the communication groove, wherein an end on the inner side in the tread width direction of the widthwise groove opens to the center circumferential groove and an end on the outer side in the tread width direction of the widthwise groove is located on the inner side in the tread width direction than a position distanced by ⅜ of the tread width from the tire equatorial plane toward the outer side in the tread width direction. The "tread width" represents a length in the tread width direction between respective ends of a ground contact surface of a tread portion of a tire in a state where the tire has been assembled with a prescribed rim and inflated at the normal internal pressure.

Further, it is preferable that: our pneumatic tire further comprises shoulder circumferential grooves formed on respective sides of the tire equatorial plane to each continuously extend in the tread circumferential direction to intersect the lug grooves; and the widthwise groove extends to intersect the corresponding shoulder groove.

Yet further, it is preferable in our pneumatic tire that: the communication groove and the widthwise groove each extend to be inclined with respect to the tread width direction; shoulder circumferential grooves are formed on the respective sides of the tire equatorial plane to each continuously extend in the tread circumferential direction to intersect the lug grooves; the outermost end in the tread width direction of the widthwise groove opens to the corresponding shoulder circumferential groove; and positions at which the communication grooves and the widthwise grooves open to the center circumferential groove in one half tread portion on one side with respect to the center circumferential groove are shifted in the tread circumferential direction from positions at which the communication grooves and the widthwise grooves open to the center circumferential groove in the other half tread portion.

Yet further, it is preferable in our the pneumatic tire that the widthwise grooves, the center circumferential groove, the communication grooves, and the shoulder circumferential grooves each have a groove width narrow enough to be closed when these grooves are in contact with the ground in a ground contact portion of the tire. A "ground contact portion of a tire" represents in the present disclosure a tread portion in contact with a road surface in a state where the tire assembled with a prescribed rim and inflated at the normal internal pressure is vertically placed and rests still on a road surface with the load corresponding to the maximum loading capacity exerted thereon.

Yet further, it is preferable in our pneumatic tire that the widthwise grooves are formed in the tread circumferential direction in each ground contact surface region such that, at the tire equatorial plane position, the widthwise grooves are located within ±30% of the tread circumferential length of the ground contact surface region at the tire equatorial plane position, measured from the center position in the tread circumferential direction of the ground contact surface region at the tire equatorial plane position.

Yet further, it is preferable in our pneumatic tire that the widthwise groove is formed in terms of its position in the tread circumferential direction in each ground contact surface region such that: at the position distanced by ⅛ of the tread width on the outer side in the tread width direction from the tire equatorial plane (which position will be referred to as "the ⅛ position" hereinafter), the widthwise groove is located within ±25% of the tread circumferential length of the ground contact surface region at the ⅛ position, measured from the center position in the tread circumferential direction of the ground contact surface region at the ⅛ position; at the position distanced by ¼ of the tread width on the outer side in the tread width direction from the tire equatorial plane (which position will be referred to as "the ¼ position" hereinafter), the widthwise groove is located within ±20% of the tread circumferential length of the ground contact surface region at the ¼ position, measured from the center position in the tread circumferential direction of the ground contact surface region at the ¼ position; and at the position distanced by ⅜ of the tread width on the outer side in the tread width direction from the tire equatorial plane (which position will be referred to as "the ⅜ position" hereinafter), the widthwise groove is located within ±20% of the tread circumferential length of the ground contact surface region at the ⅜ position, measured from the center position in the tread circumferential direction of the ground contact surface region at the ⅜ position.

Yet further, it is preferable in our pneumatic tire that, provided that a tread portion between the tire equatorial plane and the ⅛ position represents a tread center portion, a tread portion between the ⅛ position and the ¼ position represents a tread middle portion, and a tread portion between the ¼ position and the ⅜ position represents a tread shoulder portion, a groove depth of the widthwise groove is: in the range of 40% to 110% of the lug groove depth in the tread center portion; in the range of 40% to 110% of the lug groove depth in the tread middle portion; and in the range of 40% to 90% of the lug groove depth in the tread shoulder portion.

A "groove depth" in each of the tread center portion, the tread middle portion and the tread shoulder portion is measured at the middle point in the tread width direction of the portion. The "lug groove depth" represents the maximum depth of the lug groove of a brand new tire.

According to our pneumatic tire, at least one widthwise groove is formed in a ground contact surface region demarcated between an end of a ground contact surface of a tread and the tire equatorial plane and between one pair and another pair adjacent in the tread circumferential direction of lug grooves located on respective sides of the tire equatorial plane and a communication groove making the paired lug grooves communicate with each other, such that the widthwise groove extends in the tread width direction and an end thereof on the outer side in the tread width direction terminates within the ground contact surface region. As a result, a temperature rise in the central region, generating a large amount of heat, of the tread portion can be effectively suppressed all across the central region.

In this connection, in a case where an end on the inner side in the tread width direction of the widthwise groove opens to the center circumferential groove and an end on the outer side in the tread width direction of the widthwise groove is located on the inner side in the tread width direction than the ⅜ position, a heat-dissipating effect by the widthwise groove can be significantly enhanced because air or the like, flowing through the center circumferential groove when the tire is rotated, also flows into the widthwise groove opened to the center circumferential groove; and the widthwise groove, extending from the tire equatorial plane toward the outer side in the tread width direction to the ⅜ position, can effectively suppress a decrease in rigidity of the land portions and deterioration of wear resistance performance resulting from the decrease, which decrease and deterioration would occur if the widthwise groove were to extend longer.

Further, a temperature rise in the central region, generating a large amount of heat, of the tread portion can be effectively suppressed all across the central region by further forming in the ground contact surface of the tread portion the center circumferential groove continuously extending in the tread circumferential direction on the tire equatorial plane and communicating with the communication groove.

Yet further, in a case where the shoulder circumferential grooves are formed on respective sides of the tire equatorial plane to each continuously extend in the tread circumferential direction to intersect the lug grooves and the widthwise groove extends to intersect the corresponding shoulder groove, a heat-dissipating effect by the widthwise groove can be further enhanced because air flowing through the shoulder circumferential groove flows into the widthwise groove.

Yet further, in a case where the communication groove and the widthwise groove each open to the center circumferential groove and further: the communication groove and the widthwise groove each extend to be inclined with respect to the tread width direction; the shoulder circumferential grooves are funned on the respective sides of the tire equatorial plane to each continuously extend in the tread circumferential direction to intersect the lug grooves; and the outermost end in the tread width direction of the widthwise groove opens to the corresponding shoulder circumferential groove, a block is demarcated between the tire equatorial plane and each shoulder circumferential groove and between the communication groove and the widthwise groove adjacent to each other in the tread circumferential direction such that the block is inclined with respect to the tread width direction. When the tire is rotated and the block is brought into contact with the ground, respective groove walls facing each other of the communication groove/the widthwise groove demarcating the block are bought into contact with each other from one side toward the other side in the tread width direction and thus support each other because the block are inclined with respect to the tread width direction. Accordingly, high rigidity in the width direction of the block is maintained from the one side toward the other side in the tread width direction when the block is brought into contact with the ground. As a result, it is possible to suppress a magnitude of slippage of the land portions in flexural deformation of the tread portion described below satisfactorily low and thus effectively minimize deterioration of wear resistance performance of the tire.

The flexural deformation of the tread portion tends to intensify in the central region of the tread portion. Accordingly, it is preferable that the communication groove and the widthwise groove are brought into contact with the ground from the outer side toward the inner side in the tread width direction thereof when the tire is rotated, i.e. the communication groove and the widthwise groove are inclined with respect to the tread width direction toward a direction in which the ground contact surface of the tread portion is brought into contact with the ground when the tire is rotated. Shoulder circumferential grooves each continuously extending in the tread circumferential direction to intersect the lug grooves may be formed on respective sides of the tire equatorial plane, so that air flowing through the center circumferential groove also flows into the widthwise groove to enhance the heat-dissipating effect by the widthwise groove. Further, formation of the blocks as described above causes air to easily flow into the respective grooves demarcating the blocks, thereby enhancing the heat-dissipating effect by the respective widthwise grooves.

Positions at which the communication grooves and the widthwise grooves open to the center circumferential groove in one half tread portion on one side with respect to the center circumferential groove may be shifted in the tread circumferential direction from positions at which the communication grooves and the widthwise grooves open to the center circumferential groove in the other half tread portion. In this case, since the positions at which the communication grooves and the widthwise grooves open to the center circumferential groove are shifted between the respective half tread portions, it is possible to maintain good rigidity in the width direction of the blocks and thus further effectively suppress deterioration of wear resistance performance of the tire, as compared with the case where the positions at which the communication grooves and the widthwise grooves open to the center circumferential groove, of the respective half tread portions, are aligned.

The central region of the tread portion, viewed in a cross section in the tire width direction thereof, is pushed and deformed toward the inner side in the tire radial direction when the central region is brought into contact with the ground by rotation of the tire with load exerted thereon (what is called "flexural deformation" of a tread portion). When the tire is rotated, the respective side regions of the tread portion, pulled by the flexural deformation of the central region of the tread portion, repeat a deformation behavior in which these side regions are displaced on the inner side in the tire width direction in a kicking-in situation and return to the original positions thereof on the outer side in the tire width direction in a kicking-out situation. Slippage of the land portion surfaces on the shoulder sides with respect to a road surface, associated with the deformation behavior of the side tread regions described above, can be a factor causing wear of the ground contact surface of the tread portion.

In this connection, in a case where rigidity in the tread width direction of the land portions has significantly reduced by formation of such widthwise grooves as described above in a ground contact surface of the tread portion, the aforementioned flexural deformation of the central region of the tread portion may intensify to increase a magnitude of slippage of the land portion surfaces on the shoulder sides with respect to a road surface, thereby possibly causing premature wear of tread rubber.

In view of this, the widthwise groove may have a groove width narrow enough to be closed when the groove is in contact with the ground in a ground contact portion of the tire. According to this arrangement, respective groove walls facing each other of the widthwise groove are bought into contact with each other and support each other by deformation thereof expanding toward a direction of narrowing a groove width of the widthwise groove when the widthwise groove is brought into contact with the ground, thereby successfully maintaining high rigidity of the land portions in the ground contact surface region provided with the widthwise groove and curbing a magnitude of slippage of the land portion surfaces during the aforementioned flexural deformation of the tread portion, so that deterioration of wear resistance performance due to provision of the widthwise grooves can be minimized.

Similarly, the center circumferential groove may have a groove width narrow enough to be closed when the groove is in contact with the ground in a ground contact portion of the tire. According to this arrangement, respective groove walls facing each other of the center circumferential groove support each other in the ground contact portion of the tire, thereby effectively suppressing an increase in slippage of the land portion surfaces described above and thus effectively eliminating a concern for deterioration of wear resistance performance.

For the same reasons, it is preferable that the widthwise grooves and the shoulder circumferential grooves each have a groove width narrow enough to be closed when these grooves are in contact with the ground in a ground contact portion of the tire.

The widthwise grooves may be formed in the tread circumferential direction in each ground contact surface region such that: at the tire equatorial plane position, the widthwise grooves are located within ±30% of the tread circumferential length of the ground contact surface region at the tire equatorial plane position, measured from the center position in the tread circumferential direction of the ground contact surface region at the tire equatorial plane position; at the ⅛ position, the widthwise grooves are located within ±25% of the tread circumferential length of the ground contact surface region at the ⅛ position, measured from the center position in the tread circumferential direction of the ground contact surface region at the ⅛ position; at the ¼ position, the widthwise grooves are located within ±20% of the tread circumferential length of the ground contact surface region at the ¼ position, measured from the center position in the tread circumferential direction of the ground contact surface region at the ¼ position; and at the ⅜ position, the widthwise grooves are located within ±20% of the tread circumferential length of the ground contact surface region at the ⅜ position, measured from the center position in the tread circumferential direction of the ground contact surface region at the ⅜ position. According to these arrangements, the heat-dissipating effect by the widthwise grooves can be effectively caused because the widthwise grooves are provided in the tread circumferential direction in the ground contact surface region at adequate positions where a rate of temperature rise is relatively high.

In other words, if the widthwise grooves are disposed such that the aforementioned range requirements are not satisfied at the respective widthwise positions, the widthwise grooves will not exist in the tread circumferential direction at the positions which are likely to experience particularly high rise in temperature, thereby possibly failing to satisfactorily suppress a temperature rise in the tread portion by provision thereof.

Further, a groove depth of the widthwise groove may be: in the range of 40% to 110% of the lug groove depth in the tread center portion; in the range of 40% to 110% of the lug groove depth in the tread middle portion; and in the range of 40% to 90% of the lug groove depth in the tread shoulder portion. According to these arrangements, it is possible to: effectively dissipate heat generated in the vicinity of a belt (which normally generates a large amount of heat) on the inner peripheral side of tread rubber by increasing a groove depth of the widthwise groove in the tread center portion and the tread middle portion each experiencing a high rate of temperature rise; and reduce an impact on wear resistance performance of the tire by making a groove depth of the widthwise groove in the tread shoulder portion not experiencing a high rate of temperature rise shorter than those in the tread center portion and the tread middle portion (if a groove depth of the widthwise groove is too large, the groove depth may adversely affect the wear resistance performance of the tire).

More specifically, if a groove depth of the widthwise groove in the tread shoulder portion exceeds 90% of the lug groove depth, such a large groove depth of the widthwise groove in the tread shoulder portion not experiencing so high tread internal temperature when the tire is rotated with load exerted thereon does not make so much contribution to suppression of temperature rise in other tread portions but may rather exceedingly decrease rigidity of the land portions to cause premature wear of tread rubber.

DETAILED DESCRIPTION

One embodiment of our pneumatic tire will be described with reference to the drawings hereinafter.

Figure 1:
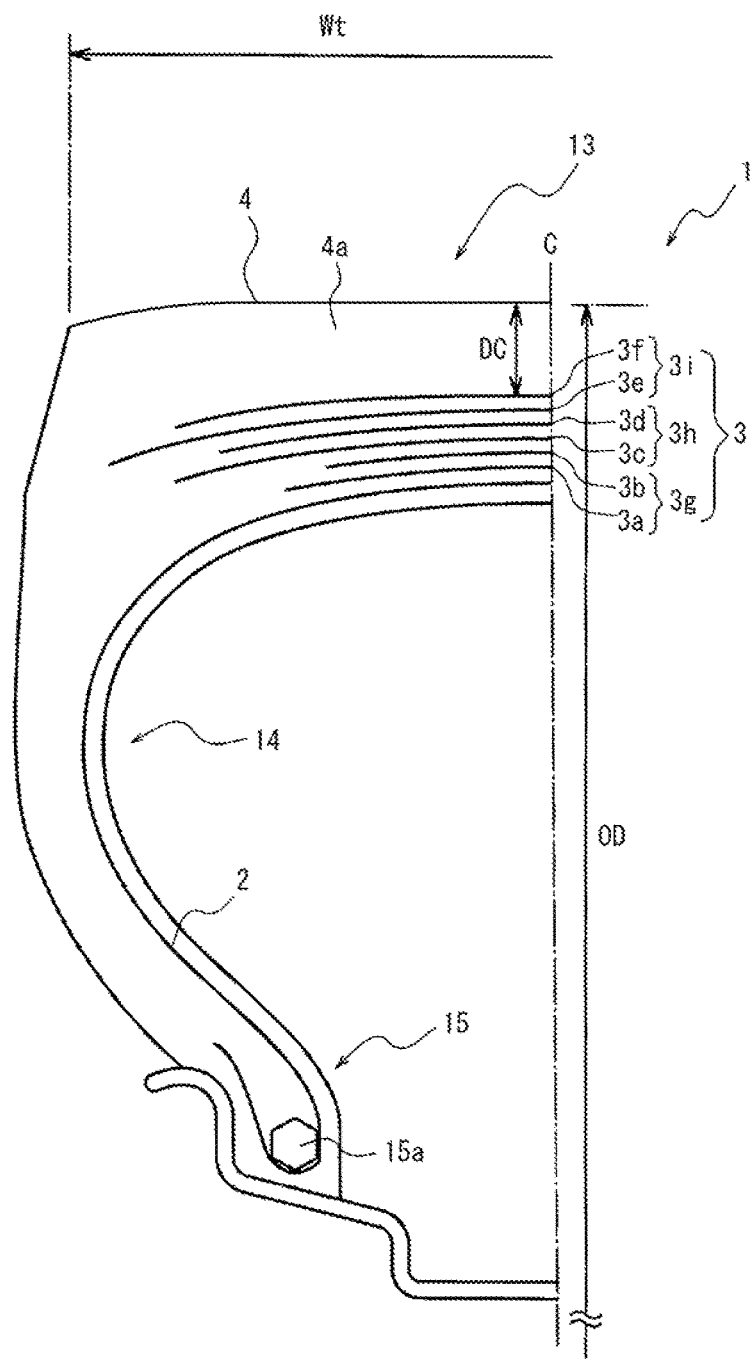
FIG. 1 is a cross sectional view in the tire width direction of a half portion of a pneumatic tire according to one embodiment of our pneumatic tire.

FIG. 1 is a view exemplarily showing a cross section in the tire width direction of a half portion of our pneumatic tire according to one embodiment thereof. The pneumatic tire 1 shown in FIG. 1 is, for example, a heavy duty tire for a construction vehicle.

The pneumatic tire 1 shown in FIG. 1 has a tread portion 13, a pair of sidewall portions 14 continuously extending on respective sides of the tread portion 13 (only one side thereof is shown in FIG. 1), and bead portions 15 formed continuously with the respective sidewall portions 14 (only one of the bead portions is shown in FIG. 1). The pneumatic tire 1 further has bead cores 15a embedded in the respective bead portions 15 (only one of the bead cores is shown in FIG. 1) and a carcass 2 extending in a toroidal shape across the respective bead cores 15a along the bead portions 15, the sidewall portions 14 and the tread portion 13.

Further, a belt 3 extending in the tire circumferential direction is provided on the outer side in the tire radial direction of the carcass 2 and tread rubber 4a is provided on the outer side in the tire radial direction of the belt 3 in the tread portion 13. A ground contact surface of the tread is provided with various grooves, although a center circumferential groove, a lug groove, a communication groove and the like described below are not shown in FIG. 1.

The carcass 2, constituting a skeleton portion of the tire 1, extends in a toroidal shape on the inner side of the members as described above and is turned up from the inner side toward the outer side in the tire radial direction around the respective bead cores 15a to cover them.

The carcass 2 is constituted of carcass cords formed, for example, by steel wires and extending in a predetermined direction. The carcass cords of the carcass 2 extend in the tread width direction, i.e. the carcass 2 is a radial carcass, in the present embodiment. The carcass 2 shown in FIG. 1 includes a single ply but may include two or more plies, according to necessity, in the tire 1 of the present embodiment.

The belt 3 is constituted of belt cords which are formed by, for example, steel wires. The belt cords extend to be inclined with respect to a predetermined direction in which the carcass cords of the carcass 2 extend.

The belt 3 may be formed by a plurality of belt layers. The belt 3 of the tire 1 exemplarily shown in FIG. 1 includes six belt layers, i.e. a first belt layer 3a, a second belt layer 3b, . . . and a sixth belt layer 3f, disposed from the inner side toward the outer side in the tire radial direction in this order.

Specifically, the first belt layer 3a and the second belt layer 3b constitute an inner intersecting belt group 3g, the third belt layer 3c and the fourth belt layer 3d constitute an intermediate intersecting belt group 3h, and the fifth belt layer 3e and the sixth belt layer 3f constitute an outer intersecting belt group 3i.

A width of the inner intersecting belt group 3g is in the range of 25% to 70% of the tread width, a width of the intermediate intersecting belt group 3h is in the range of 55% to 90% of the tread width, and a width of the outer intersecting belt group 3i is in the range of 60% to 110% of the tread width in the embodiment shown in FIG. 1. Widths of the respective belt layers included in each intersecting belt group may be either equal to or different from each other as long as these widths are within the required range described above. Widths of the belt layers increase in the order of the second belt layer 3b, the first belt layer 3a, the fourth belt layer 3d, the sixth belt layer 3f, the third belt layer 3c, and the fifth belt layer 3e in the present embodiment. That is, the second belt layer 3b has the smallest width and the fifth belt layer 3e has the largest width. A width of each belt layer represents a length measured in the tread width direction.

An inclination angle of the belt cords of each belt layer with respect to the carcass cords, in a plan view of the tread, is in the range of 70° to 85° in the inner intersecting belt group 3g, in the range of 50° to 75° in the intermediate intersecting belt group 3h, and in the range of 50° to 70° in the outer intersecting belt group 3i, respectively, in the present embodiment.

Regarding the inclination angles of the belt cords of the respective intersecting belt groups with respect to the carcass cords in a plan view of the tread, the inclination angle of the inner interesting belt group 3g is the largest and the inclination angle of the intermediate interesting belt group 3h is equal to or larger than the inclination angle of the outer interesting belt group 3i.

Inclination angles of the belt cords of the respective belt layers included in each intersecting belt group may be either equal to or different from each other as long as the inclination angles are within the required range described above. The respective belt layers in each intersecting belt group are provided such that the belt cords of one belt layer are inclined with respect to the carcass cords in a direction symmetrical to a direction in which the belt cords of the other belt layer are inclined.

The tire 1 has a significantly thick rubber gauge (rubber thickness) of the tread portion 13, as shown in FIG. 1, as compared with a pneumatic tire mounted for a passenger vehicle or the like. A pneumatic tire according to another embodiment of our pneumatic tire, described below, also has a tire structure similar to that of the tire 1 exemplarily shown in FIG. 1.

Specifically, provided that OD represents the outer diameter of the tire and DC represents a rubber gauge of the tread portion 13 at the tire equatorial plane C position, DC/OD≥0.015 in the tire 1.

The outer diameter OD (unit: mm) of the tire is a diameter of the tire 1 at a portion thereof reaching largest diameter (a portion in the vicinity of the tire equatorial plane C, of the tread portion 13, in general). The rubber gauge DC (unit: mm) is rubber thickness of the tread portion 13 at the tire equatorial plane C position. The rubber gauge DC does not include the thickness of the belt 3. In a case where a circumferential groove is formed in the tread portion 13 at a position including the tire equatorial plane C, the rubber gauge DC represents rubber thickness of the (non-recessed) tread portion 13 at a position adjacent to the circumferential groove.

Figure 2:
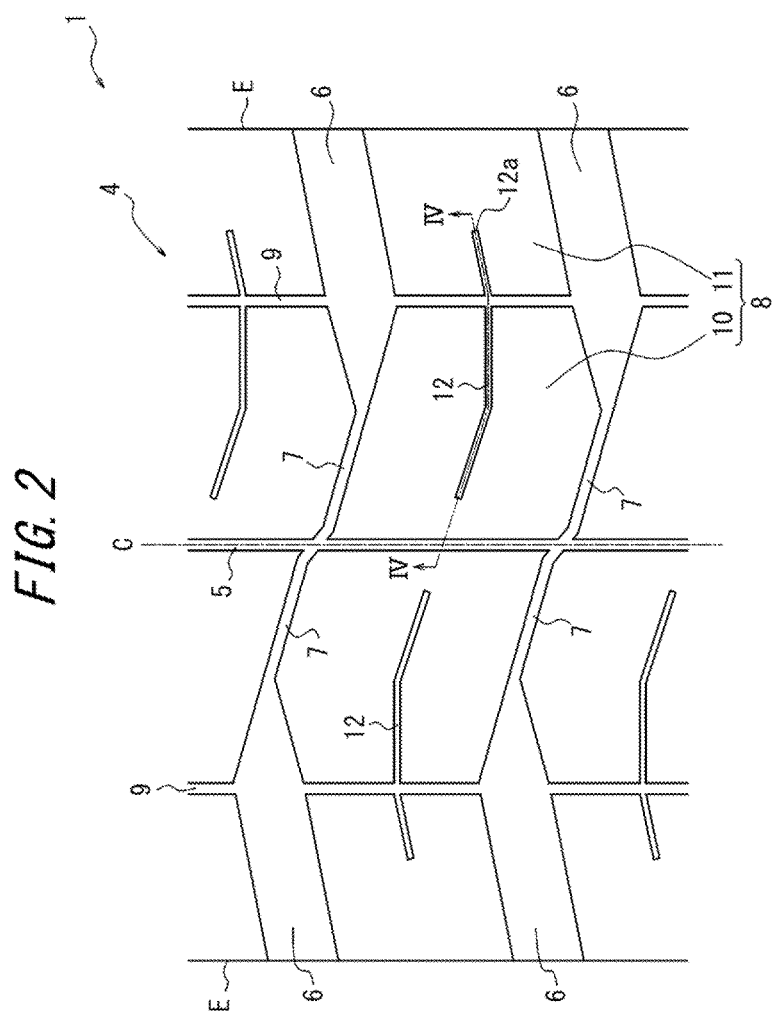
FIG. 2 is a partially developed view of a tread pattern of the pneumatic tire shown in FIG. 1.

Next, a tread pattern will be described hereinafter by using a developed view of FIG. 2 showing a main portion of the tread pattern in an enlarged manner. As shown in FIG. 2 as a partially developed view of the tread pattern, the tire 1 has in a ground contact surface 4: an annular center circumferential groove 5 linearly extending in a plan view in the tread circumferential direction on the tire equatorial plane C; and lug grooves 6 formed on respective sides of the tire equatorial plane C such that each lug groove 6 opens to the corresponding ground contact surface end E of the tread, extends to be slightly inclined with respect to the tread width direction toward the tire equatorial plane side C, and terminates before reaching the center circumferential groove 5. It should be noted that provision of the center circumferential groove 5 is not essentially required in our pneumatic tire, although the center circumferential groove 5 is formed on the tire equatorial plane C in the example shown in the drawings.

Figure 6:
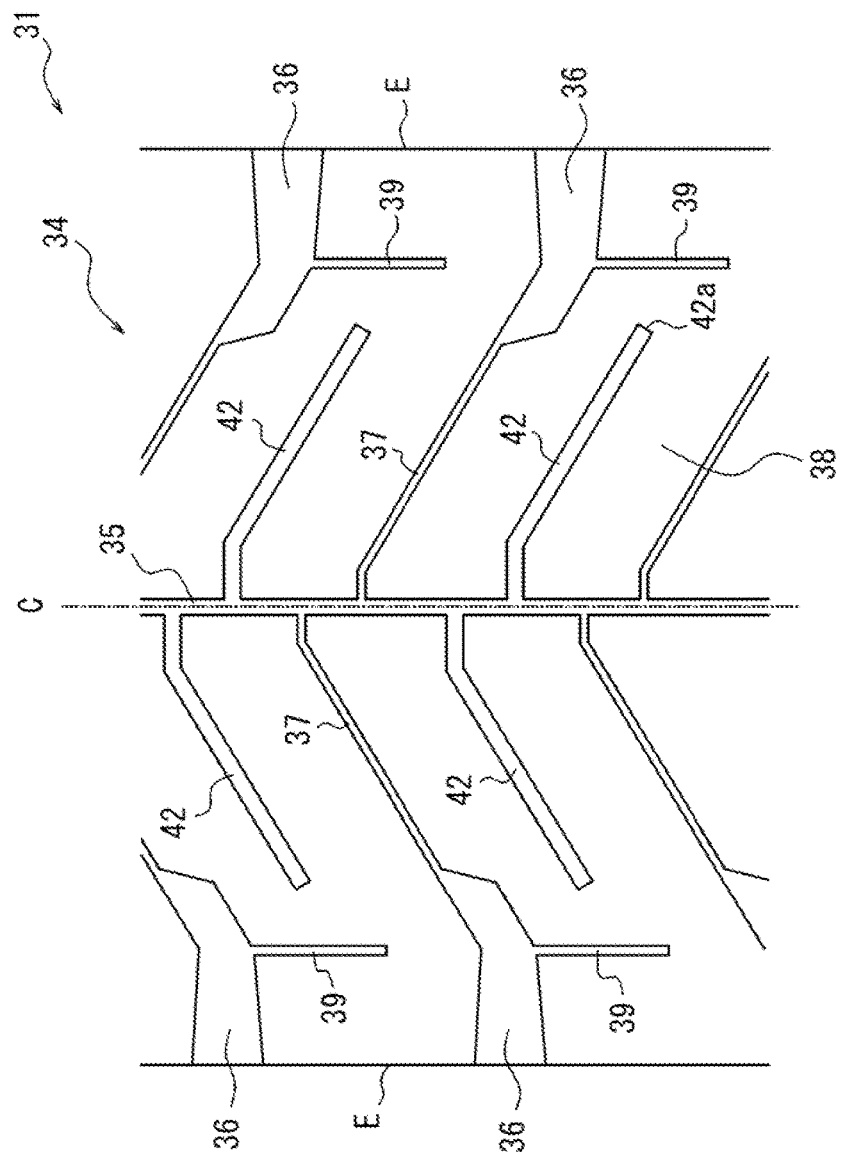
FIG. 6 is a partially developed view of a tread pattern of a pneumatic tire according to another embodiment of our pneumatic tire.

The lug grooves 6 are provided on the respective sides of the tire equatorial plane C in a widthwise paired manner in the present embodiment. A communication groove 7 which opens to the center circumferential groove 5 and a tip end portion having a width gradually decreasing toward the tire equatorial plane C side, of the corresponding lug grove 6, to make the widthwise paired lug grooves 6 communicate with each other via the tire equatorial plane C (via the center circumferential groove 5 in the example shown in FIG. 2) is formed such that the communication groove 7 extends to be slightly inclined with respect to the tread width direction and bend in the vicinities of the center circumferential groove 5. A configuration of the communication groove 7 is not limited to that shown in the drawings as long as the communication groove 7 makes the widthwise paired lug grooves 6 communicate with each other directly (e.g. FIG. 2) or indirectly on the tire equatorial plane C. The communication groove 7 may make the widthwise paired lug grooves 6 communicate with each other indirectly via the center circumferential groove 5, as shown in FIG. 6.

Accordingly, in a ground contact surface 4 of the tread having the center circumferential groove 5, the lug grooves 6 and the communication grooves 7 formed therein, a ground contact surface region 8 is demarcated between the ground contact surface end E of the tread and the tire equatorial plane C (the center circumferential groove 5 in the example shown in FIG. 2) and between one set and another set adjacent to each other in the tread circumferential direction of the widthwise paired lug grooves 6 and the communication groove 7 connecting the lug grooves, on the respective sides of the center circumferential groove 5.

An annular shoulder circumferential groove 9 linearly and continuously extending in a plan view in the tread circumferential direction to intersect the lug grooves 6 is formed on each side of the tire equatorial plane C at a position between the ¼ position and the ⅜ position (not including the ¼ position and the ⅜ position), as shown in FIG. 2. The ground contact surface region 8 includes two blocks 10, 11 demarcated by the shoulder circumferential groove 9 and thus adjacent to respective sides of the shoulder circumferential groove 9 in the present embodiment shown in FIG. 2. Provision of the shoulder circumferential groove 9, however, is not essentially required in our pneumatic tire.

At least one (one in FIG. 2) widthwise groove 12 extending in the tread width direction is formed in each of the ground contact surface regions 8 such that the outer end 12a in the tread width direction of the widthwise groove 12 terminates within the ground contact surface region 8 in the present embodiment. Provision of the widthwise groove 12 increases a heat-dissipating area of the ground contact surface 4 of the tread, thereby effectively suppressing a temperature rise in the central region of the tread portion when the tire 1 is used (tire troubles due to heat generation in the tread portion is most likely to occur in the central region thereof).

Further, high rigidity in the tread width direction of the land portions can be maintained in the present embodiment because the outer end 12a in the tread width direction of the widthwise groove 12 terminates within the ground contact surface region 8, as compared with a case where the outer end in the tread width direction of the widthwise groove opens to the ground contact surface end E of the tread or the like.

Yet further, provision of the annular center circumferential groove 5 linearly and continuously extending in a plan view in the tread circumferential direction on the tire equatorial plane C increases a heat-dissipating area of the ground contact surface 4 of the tread, thereby effectively suppressing a temperature rise in the central region of the tread portion when the tire 1 is used (tire troubles due to heat generation in the tread portion is most likely to occur in the central region thereof).

In this connection, if rigidity in the tread width direction of the land portions has significantly decreased by provision of the widthwise groove 12 in the ground contact surface region 8, the ground contact surface region 8 is then susceptible to elastic deformation toward the inner/outer side in the tread width direction and thus the aforementioned flexural deformation of the central region of the tread portion when the tire 1 is rotated with load exerted thereon, whereby the ground contact surface region 8, subjected to the elastic deformation toward the inner/outer side in the tread width direction every time the region 8 is brought into contact with the ground, may exhibit a larger magnitude of slippage of the land portion surfaces thereof and thus severer or accelerated wear. Accordingly, it is preferable that the widthwise groove 12 has a groove width narrow enough to be closed when the groove is in contact with the ground in a ground contact portion of the tire 1, as shown in FIG. 2.

According to the arrangement described above, respective groove walls facing each other and constituting the widthwise groove 12 are bought into contact with each other and thus support each other in the ground contact portion of the tire 1, thereby suppressing deterioration of rigidity of the land portions. As a result, it is possible to obtain a good heat-dissipating effect by the widthwise groove 12 in the tread portion, while preventing premature wear from occurring in the ground contact surface region 8.

Similarly, it is preferable that the center circumferential groove 5, the shoulder circumferential grooves 9, and the communication grooves 7 each have a groove width narrow enough to be closed when these grooves are in contact with the ground in a ground contact portion of the tire, as shown in FIG. 2, in terms of suppressing wear of the ground contact surface region 8. However, any of the widthwise grooves, the center circumferential groove, the shoulder circumferential grooves and the communication grooves may have a groove width larger than the groove width narrow enough to be closed when the groove is in contact with the ground in a ground contact portion of the tire.

The widths of the center circumferential groove 5, the shoulder circumferential grooves 9, the communication grooves 7 and the widthwise grooves 12, each of which widths is narrow enough to be closed when these grooves are in contact with the ground in a ground contact portion of the tire as described above, may be in the range of 0.5% to 2% of the tread width Wt. Groove depths of the center circumferential groove 5, the shoulder circumferential grooves 9 and the communication grooves 7, measured in the tire radial direction in the tire assembled with a prescribed rim and inflated at the normal pressure, may be in the range of 60% to 110% of the maximum groove depth of the lug groove 6. A groove depth of the widthwise groove 12, measured in the tire radial direction in the tire assembled with a prescribed rim and inflated at the normal pressure, may be in the range of 40% to 110% of the maximum groove depth of the lug groove 6.

The widthwise groove 12 need not always extend exactly in the tread width direction but may extend to be slightly inclined toward the tread circumferential direction from the tread width direction, as shown in FIG. 2. In a case where the widthwise groove 12 includes a portion extending to be inclined with respect to the tread width direction, as shown in FIG. 2, an inclination angle of the portion inclined with respect to the tread width direction, of the widthwise groove 12, is preferably a relatively small angle, e.g. ≤50°, in terms of suppressing deterioration of rigidity in the tread width direction of the land portions due to provision of the widthwise groove 12 and effectively preventing premature wear of the tread rubber 4a. The widthwise groove 12, however, may extend exactly in the tread width direction over the entire portion thereof, although not shown in the drawings.

The ground contact surface region 8 may further be provided with a widthwise groove including at least one curved portion (not shown in the drawings), other than the widthwise groove 12 having at least one bent portion as shown in FIG. 2.

Figure 3:
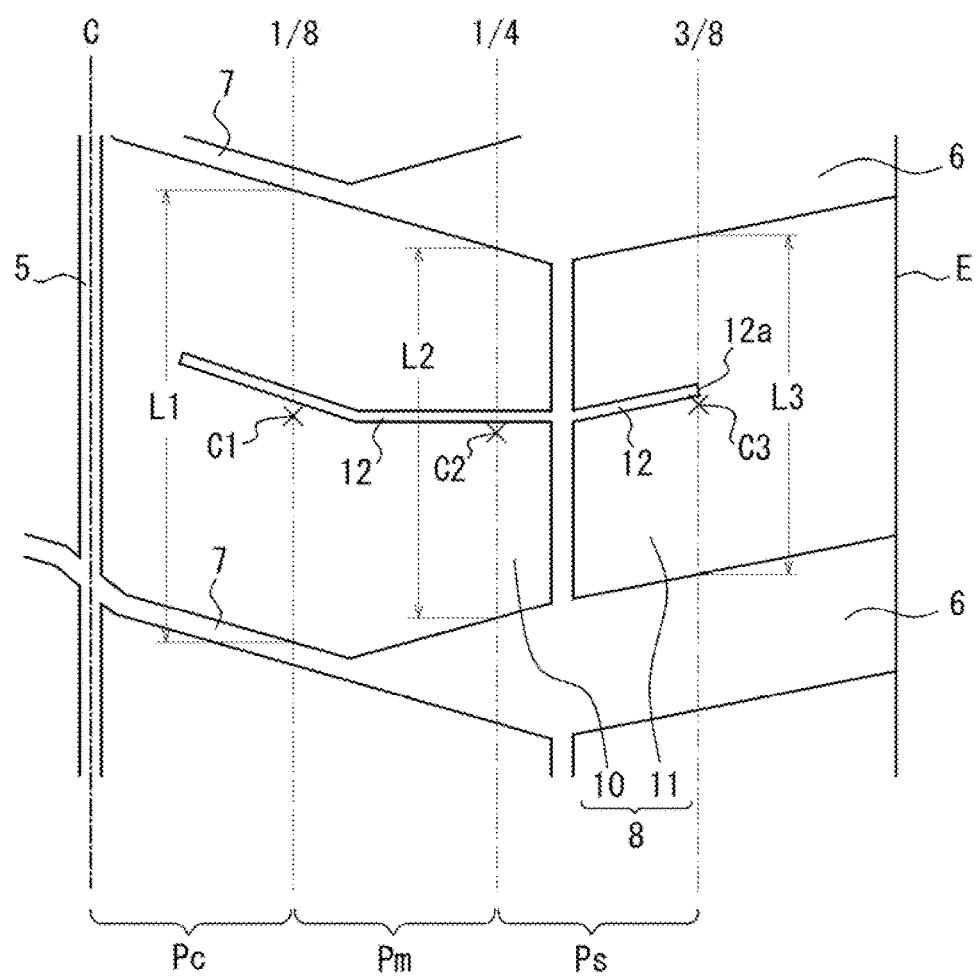
FIG. 3 is a developed view showing a main portion of the tread pattern of FIG. 2 in an enlarged manner.

For provision of the widthwise groove 12 as described above in adequate portions in the ground contact surface region 8 to achieve a good heat-dissipating effect in the tread portion and a good wear suppression effect in the ground contact surface 4 of the tread in a highly compatible manner, the ground contact surface region 8 is hypothetically divided by the ⅛ position distanced by ⅛ of the tread width Wt on the outer side in the tread width direction from the tire equatorial plane C, the ¼ position similarly distanced by ¼ of the tread width Wt, and the ⅜ position similarly distanced by ⅜ of the tread width Wt, as shown in FIG. 3 in an enlarged manner, according to a distribution in the tread width direction of a rate of temperature rise in the tread portion (the rate of temperature rise increases toward the tire equatorial plane C). A tread portion between the tire equatorial plane C and the ⅛ position represents a tread center portion Pc (0≤Pc≤⅛), a tread portion between the ⅛ position and the ¼ position represents a tread middle portion Pm (⅛<Pm≤¼), and a tread portion between the ¼ position and the ⅜ position represents a tread shoulder portion Ps (¼<Pc≤⅜) in the ground contact surface region 8.

Figure 4:
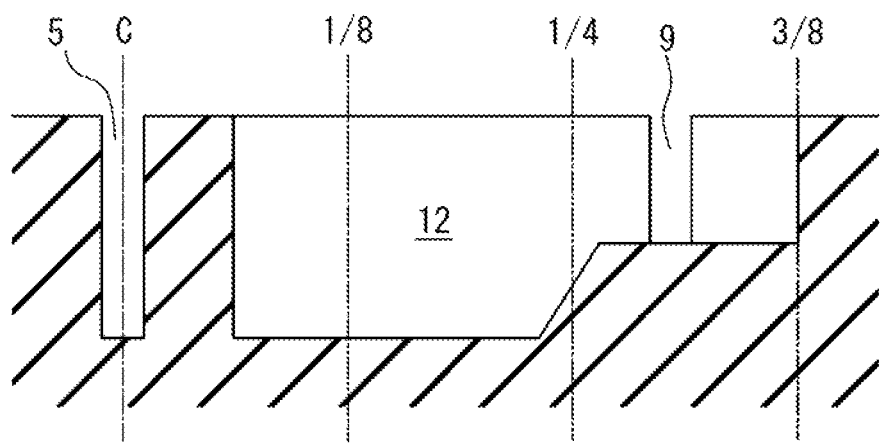
FIG. 4 is a cross sectional view of the tread cut along the IV-IV line in FIG. 2.

A groove depth of the widthwise groove 12 may change as the groove extends, as exemplarily shown in a cross sectional view of FIG. 4, in the present embodiment. In this case, a groove depth of the widthwise groove 12 is preferably: in the range of 40% to 110% of the lug groove depth in the tread center portion Pc; in the range of 40% to 110% of the lug groove depth in the tread middle portion Pm; and in the range of 40% to 90% of the lug groove depth in the tread shoulder portion Ps. The groove depth of the widthwise groove 12 is measured in each of the tread center portion Pc, the tread middle portion Pm and the tread shoulder portions Ps at the middle point in the tread width direction of the portion.

According to these arrangements, it is possible to: effectively dissipate heat accumulated in the vicinity of a belt 3 (which normally generates a large amount of heat) by increasing a groove depth of the widthwise groove 12 in the tread center portion Pc and the tread middle portion Pm close to the tire equatorial plane C experiencing a particularly high rate of temperature rise; and suppress deterioration of rigidity of the land portions to a minimum by making a groove depth of the widthwise groove 12 in the tread shoulder portion Ps not experiencing a high rate of temperature rise shorter than those in the tread center portion Pc and the tread middle portion Pm.

As shown in FIG. 3, the widthwise groove 12 is preferably formed in terms of its position in the tread circumferential direction in each ground contact surface region 8 such that: at the ⅛ position, the widthwise groove 12 is located within ±25% of the tread circumferential length L1 of the ground contact surface region 8 at the ⅛ position, measured from the center position C1 in the tread circumferential direction of the ground contact surface region at the ⅛ position (i.e. a range between two positions spaced by 25% of L1, respectively, from the center position C1 on the upper/lower side in FIG. 3); at the ¼ position, the widthwise groove 12 is located within ±20% of the tread circumferential length L2 of the ground contact surface region 8 at the ¼ position, measured from the center position C2 in the tread circumferential direction of the ground contact surface region 8 at the ¼ position; and at the ⅜ position, the widthwise groove 12 is located within ±20% of the tread circumferential length L3 of the ground contact surface region 8 at the ⅜ position, measured from the center position C3 in the tread circumferential direction of the ground contact surface region 8 at the ⅜ position. This arrangement is preferable because it allows the widthwise groove 12 to effectively dissipate heat at positions in the tread circumferential direction, each experiencing a particularly high rate of temperature rise, of the ground contact surface region 8.

The rate of temperature rise tends to be particularly high on the inner side in the tread width direction than the ¼ position, thereby possibly causing thermal degradation of rubber in the region. In order to prevent such degradation from occurring, the outer end 12a in the tread width direction of the widthwise groove 12 is preferably located on the outer side in the tread width direction than the ¼ position. However, the outer end 12a in the tread width direction of the widthwise groove 12 is preferably located on the inner side in the tread width direction than the ⅜ position because rigidity of the land portions may decrease if the widthwise groove 12 extends too long.

The inner end in the tread width direction of the widthwise groove 12 does not open to the center circumferential groove 5 in the example shown in FIG. 3. In a case where the widthwise groove 12 is formed such that the inner end in the tread width direction thereof opens to the center circumferential groove 5 as described below, the widthwise groove 12 is preferably located, at the tire equatorial plane C position, within ±30% of the tread circumferential length of the ground contact surface region 8 at the position, measured from the center position in the tread circumferential direction of the ground contact surface region at the position.

The shoulder circumferential groove 9 is formed as described above and extends to cut through or intersect the widthwise groove 12 in the tread pattern shown in FIG. 2. In this case, provision of the shoulder circumferential groove 9 not only simply increases a heat-dissipating area but also causes a good air-cooling effect by itself because air passing through the shoulder circumferential groove 9 flows into the widthwise grooves 12 intersecting the shoulder circumferential groove 9 when the tire 1 is rotated with load exerted thereon, which air flow significantly improves heat dissipation by the widthwise grooves 12.

Figure 5A:
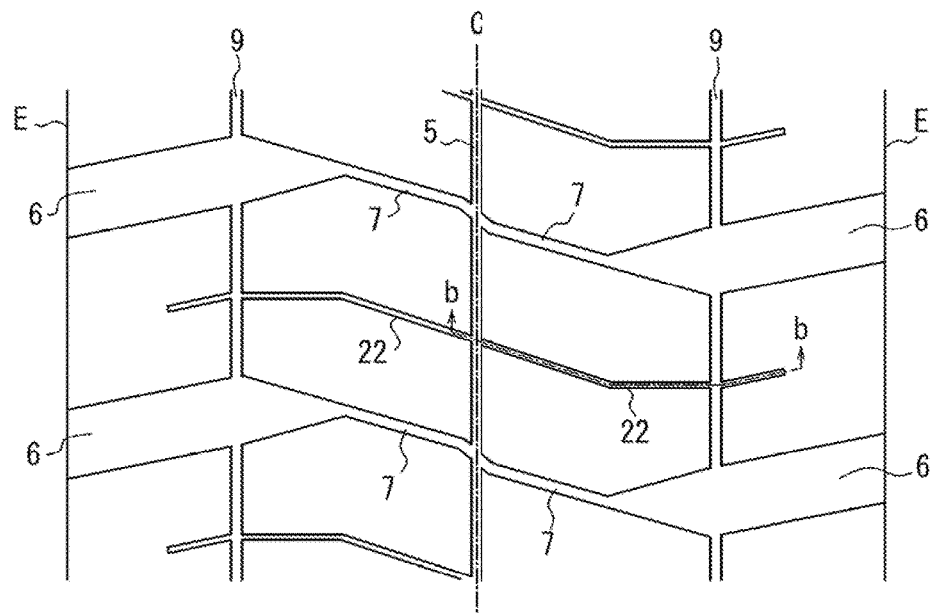
FIG. 5A is a partially developed view of a tread pattern of a modified example of widthwise groove disposition in a ground contact surface region.
Figure 5B:
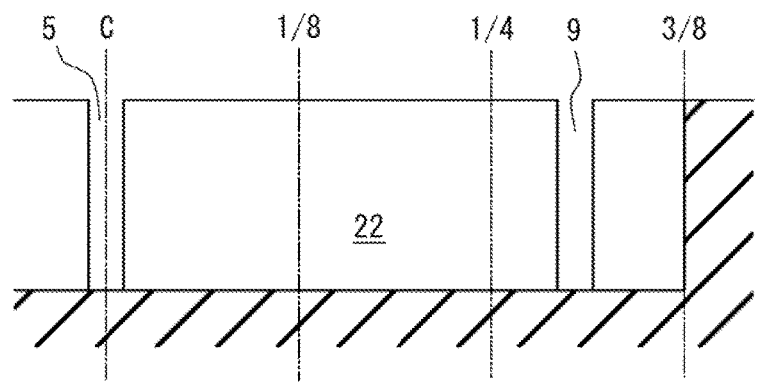
FIG. 5B is a cross sectional view of the tread cut along the b-b line in FIG. 5A.

In a modified example of the widthwise groove disposition shown in FIGS. 5A and 5B, the inner end in the tread width direction of a widthwise groove 22 of the modified example opens to the center circumferential groove 5 in order to further enhance the aforementioned air-cooling effect of the widthwise groove (see FIG. 5A). In this connection, a groove width of the widthwise groove 22 may remain unchanged over the entire length thereof, as shown in FIG. 5B.

The center circumferential groove 5 and the shoulder circumferential groove 9 described above may have zigzag shapes extending in the tread circumferential direction or the like (not shown), respectively.

FIG. 6 shows a tread pattern of another embodiment of our pneumatic tire. A tire 31 shown in FIG. 6 has in a ground contact surface 34 of a tread portion: a center circumferential groove 35 continuously extending in the tread circumferential direction on the tire equatorial plane C; a lug groove 36 opening at an end E of the ground contact surface of the tread portion and extending toward the center circumferential groove 35 to terminate before reaching the center circumferential groove 35, the lug groove 36 having a bent portion bent toward the bottom→upper direction in FIG. 6 before reaching the center circumferential groove 35; and a communication groove 37 extending linearly from the tip end portion of the lug groove 36 substantially in parallel to the bent portion of the lug groove 36, to be inclined with respect to the tread circumferential direction, and being bent in the vicinity of the center circumferential groove 35 to extend in the tread width direction and open to the center circumferential groove 35 so that the lug groove 36 communicates with the center circumferential groove 35.

Positions of the lug grooves 36 in one half tread portion on one side of the center circumferential groove 35 are slightly shifted in the tread circumferential direction from positions of the lug grooves 36 in the other half tread portion. Accordingly, positions at which the communication grooves 37 in one half tread portion on one side of the center circumferential groove 35 open to the center circumferential groove 35 are slightly shifted in the tread circumferential direction from positions at which the communication grooves 37 in the other half tread portion open to the center circumferential groove 35.

As a result, a ground contact surface region 38 is demarcated in the ground contact surface 34 of the tread portion between the end E of the ground contact surface of the tread portion and the center circumferential groove 35 and between one pair and another pair adjacent thereto in the tread circumferential direction, of the lug groove 36 and the communication groove 37 communicating therewith, such that positions of the lug grooves 36 and the communication grooves 37 in one half tread portion on one side of the center circumferential groove 35 are slightly shifted in the tread circumferential direction from positions of the lug grooves 36 and the communication grooves 37 in the other half tread portion. Further, a widthwise groove 42 extending substantially in parallel to the communication groove 37 to open to the center circumferential groove 35 is formed in a portion substantially in the middle in the tread circumferential direction of the ground contact surface region 38 such that the outer end 42a in the tread width direction of the widthwise groove 42 terminates within the ground contact surface region 38 before reaching the end E of the ground contact surface of the tread.

A circumferential intermittent groove 39, having a groove width narrow enough to be closed when the groove is in contact with the ground in a ground contact portion of the tire, is formed at a widthwise position where the lug groove 36 bends, such that the circumferential intermittent groove 39 opens to the lug groove 36 at the lug groove 36-bent widthwise position from lower side in FIG. 6 and extends in the tread circumferential direction, intermittently in a plan view, in the present embodiment. The outer end 42a in the tread width direction of the widthwise groove 42 described above terminates on the inner side in the tread width direction than the circumferential intermittent groove 39. However, the outer end in the tread width direction of the widthwise groove 42 may reach or even intersect the circumferential intermittent groove 39 (not shown in the drawings).

Further alternatively, two or more widthwise grooves may be provided in the ground contact surface region 38 so as to, for example, extend in parallel to each other (not shown in the drawings).

Figure 7:
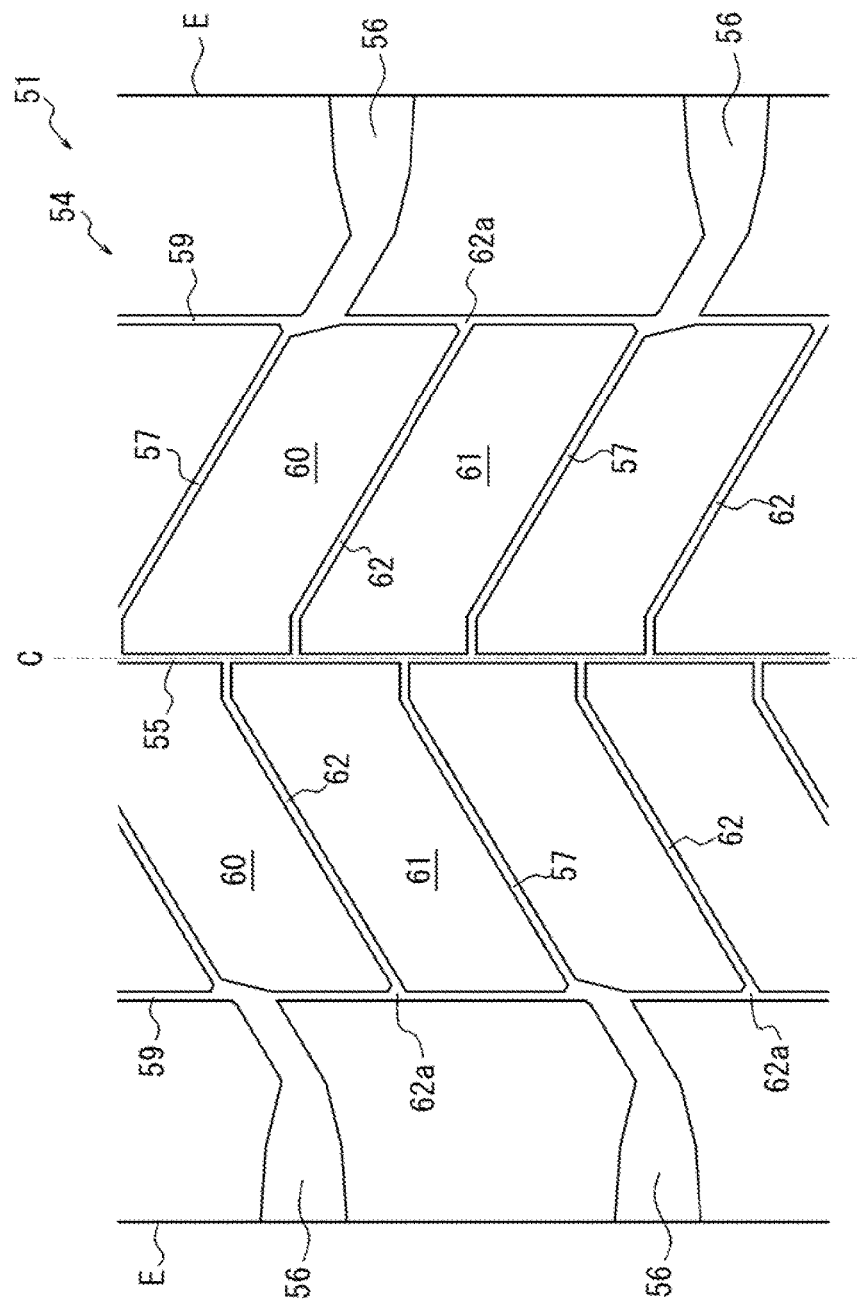
FIG. 7 is a partially developed view of a tread pattern of a pneumatic tire according to yet another embodiment of our pneumatic tire.

FIG. 7 shows a tread pattern of yet another embodiment of our pneumatic tire.

A tire 51 shown in FIG. 7 has in a ground contact surface 54 of a tread portion: a center circumferential groove 55 continuously extending in the tread circumferential direction on the tire equatorial plane C; a lug groove 56 opening at an end E of the ground contact surface of the tread portion and extending toward the center circumferential groove 55 to terminate before reaching the center circumferential groove 55; and a communication groove 57 extending linearly (from the lug groove 56) to be inclined with respect to the tread circumferential direction and being bent in the vicinity of the center circumferential groove 55 to extend in the tread width direction and open to the center circumferential groove 55, so that the lug groove 56 communicates with the center circumferential groove 55. The inner end in the tread width direction of the communication groove 57 opens to the center circumferential groove 5.

Each lug groove 56 has a reduced-width portion where a groove width gradually decreases and a bent portion bent toward the bottom→upper direction in FIG. 7 as the lug groove 56 extends toward the center circumferential groove 55. The communication groove 57 extends from the tip end of the lug groove 56 substantially in parallel to the bent portion of the lug groove 56.

Further, a widthwise groove 62 extending substantially in parallel to the communication groove 57 to open to the center circumferential groove 55 is formed in a portion substantially in the middle in the tread circumferential direction of the ground contact surface region (between the respective two adjacent communication grooves 57), as shown in FIG. 7.

Yet further, an annular shoulder circumferential groove 59 is formed on each side of the tire equatorial plane C such that the shoulder circumferential groove 59 extends linearly and continuously in the tread circumferential direction to intersect the tip end portions or the vicinities thereof of the lug grooves 56 in the tire 51, as shown in FIG. 7. The outer end 62a in the tread width direction of the widthwise groove 62 opens to the shoulder circumferential groove 59. An extension length of the communication groove 57 and an extension length of the widthwise groove 62 are substantially the same because the widthwise groove 62 opens to the center circumferential groove 55 and the shoulder circumferential groove 59. The shoulder circumferential groove 59 has a groove width narrow enough to be closed when the groove is in contact with the ground in a ground contact portion of the tire in the example shown in FIG. 7. However, the shoulder circumferential groove 59 may have a groove width not closed when the groove is in contact with the ground in a ground contact portion of the tire. The widthwise groove 62 may further extend on the outer side in the tread width direction after intersecting the shoulder circumferential groove 59.

Accordingly, blocks 60, 61 each having a substantially parallelogram configuration are formed in the tire 51 between the tire equatorial plane C and the shoulder circumferential groove 59 and between the communication grooves 57 and the widthwise grooves 62 alternately adjacent to each other in the tread circumferential direction such that the blocks 60, 61 are inclined with respect to the tread width direction, as shown in FIG. 7. When the tire 51 is rotated and the ground contact surface 54 is brought into contact with the ground, respective groove walls facing each other of the communication groove 57/the widthwise groove 62 demarcating the blocks 60, 61 are bought into contact with each other from one side toward the other side in the tread width direction and thus support each other, whereby high rigidity of the blocks 60, 61 is maintained from the one side toward the other side. As a result, it is possible to suppress a magnitude of slippage of the land portions in flexural deformation of the tread portion described above satisfactorily low and thus effectively minimize deterioration of wear resistance performance of the tire.

The flexural deformation of the tread portion tends to intensify in the central region of the tread portion. Accordingly, it is preferable that the communication groove 57 or the widthwise groove 62 is brought into contact with the ground from the outer side toward the inner side in the tread width direction thereof when the tire 51 is rotated, i.e. the communication groove 57 or the widthwise groove 62 is inclined with respect to the tread width direction toward a direction in which the ground contact surface 54 of the tread portion is brought into contact with the ground when the tire 51 is rotated (the bottom→upper direction in FIG. 7).

Further, lengths of the block 60 and the block 61 measured in the tread circumferential direction, respectively, are the same because the widthwise groove 62 is formed in the middle in the tread circumferential direction of the ground contact surface region defined by the two adjacent communication grooves 57. The same lengths in the tread circumferential direction of the blocks 60, 61 result in even heat generation by the blocks 60, 61 in the circumferential direction, whereby a temperature rise in the central region generating a large amount of heat, of the tread portion, can be effectively suppressed all across the central region.

Yet further, positions at which the communication grooves 57 and the widthwise grooves 62 in one half tread portion on one side of the center circumferential groove 55 open to the center circumferential groove 55 are slightly shifted in the tread circumferential direction from positions at which the communication grooves 57 and the widthwise grooves 62 in the other half tread portion open to the center circumferential groove 55. Yet further, positions of the lug grooves 56 in one half tread portion on one side of the center circumferential groove 55 are slightly shifted in the tread circumferential direction from positions of the lug grooves 56 in the other half tread portion. In other words, positions of the blocks 60, 61 in one half tread portion on one side of the equatorial plane C are shifted in the tread circumferential direction from positions of the blocks 60, 61 in the other half tread portion in the tire 51. Careless provision of the communication grooves 57 and the widthwise grooves 62 in the tire 51 could decrease rigidity in the width direction of the blocks 60, 61. However, positions at which the communication grooves 57 and the widthwise grooves 62 open to the center circumferential groove 55 are shifted or offset between one half tread portion on one side of the center circumferential groove 55 and the other half tread portion in the present embodiment, whereby it is possible to maintain high rigidity in the width direction of the blocks 60, 61 and effectively suppress deterioration of wear resistance, as compared with a case where positions at which the communication grooves 57 and the widthwise grooves 62 open to the center circumferential groove 55 are aligned between the respective half tread portions.

A negative ratio, as a ratio of the total groove area with respect to the entire surface area of a ground contact surface of a tread portion, is preferably 30% or less in any of the tires described above in terms of maintaining good wear resistance performance.

EXAMPLES

Next, test tires of our pneumatic tire were prepared and performances thereof were evaluated, as described below. The test tires shared the same size of 46/90R57.

Example tire 1 had a tread with: 980 mm and a tread pattern as shown in FIG. 2 and FIG. 3.

Examples tires 2 to 13 each had the same structure as the Example tire 1, except that some detailed characteristics of the formers were changed as shown in Table 1, respectively.

Figure 8A:
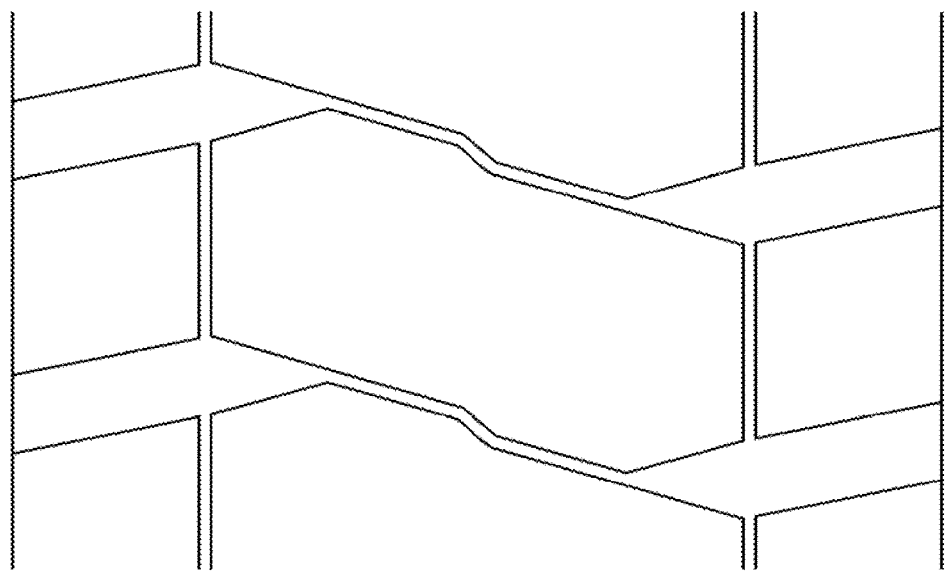
FIG. 8A is a partially developed view of a tread pattern of Comparative Example 1 tire.
Figure 8B:
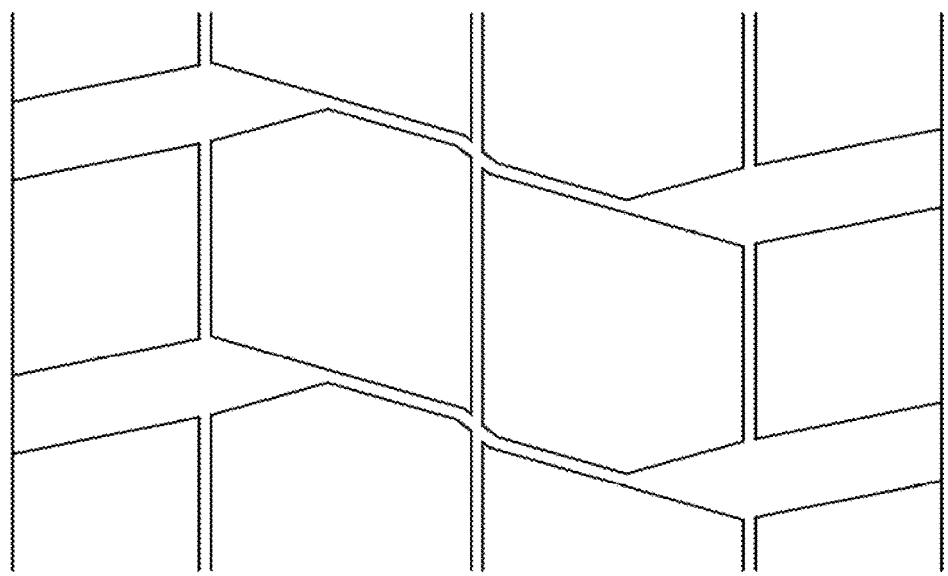
FIG. 8B is a partially developed view of a tread pattern of Comparative Example 2 tire.

Comparative Example 1 tire had the same structure as the Example tire 1, except that the former included no widthwise groove and no center circumferential groove, as shown in FIG. 8A. Comparative Example 2 tire had the same structure as the Example tire 1, except that the former included no widthwise groove, as shown in FIG. 8B.

The test tires each had a groove depth of the lug groove: 97 mm, a groove depth of the center circumferential groove: 90 mm, and a groove depth of the communication groove: 90 mm. The center circumferential groove, the communication groove, the widthwise groove, and the shoulder circumferential groove of each test tire were closed when these grooves were in contact with the ground in a ground contact portion of the tire if the groove widths thereof were each ≤10 mm.

TABLE 1

| | | | Comp. Example 1 | Comp. Example 2 | Example 1 | Example 2 | Example 3 | Example 4 | Example 5 | Example 6 |
|---|---|---|---|---|---|---|---|---|---|---|
| Tread pattern | | | FIG. 7A | FIG. 7B | FIGS. 2, 3 | FIG. 5 | — | — | — | — |
| Center circumferential groove | Groove width | | — | Closed | Closed | Closed | Closed | Not closed | Closed | Closed |
| Communication groove | Groove width (mm) | | 10 | 10 | 10 | 10 | 10 | 10 | Not closed | 10 |
| Widthwise groove | Groove width (mm) | | — | — | 10 | 10 | Not closed | 10 | 10 | 10 |
| | Groove depth | Tread center portion (%) | — | — | 100% | 100% | 100% | 100% | 100% | 100% |
| | | Tread middle portion (%) | — | — | 100% | 100% | 100% | 100% | 100% | 100% |
| | | Tread shoulder portion (%) | — | — | 60% | 100% | 60% | 60% | 60% | 100% |
| | Position in circumferential direction | | — | — | Center position of ground contact surface region | Center position of ground contact surface region | Center position of ground contact surface region | Center position of ground contact surface region | Center position of ground contact surface region | Center position of ground contact surface region |
| | Inner end in tread width direction | | — | — | 1/16 | 0 | 0 | 0 | 0 | 0 |
| | Outer end in tread width direction | | — | — | 3/8 | 3/8 | 3/8 | 3/8 | 3/8 | 4/8 |
| Shoulder circumferential groove | Groove width | | Closed | Closed | Closed | Closed | Closed | Closed | Closed | Closed |

TABLE 1-continued

|  |  | Example 7 | Example 8 | Example 9 | Example 10 | Example 11 | Example 12 | Example 13 |
|---|---|---|---|---|---|---|---|---|
| Tread pattern |  | — | — | — | — | — | — | — |
| Center circumferential groove | Groove width | Closed | Closed | Closed | Closed | Closed | — | — |
| Communication groove | Groove width (mm) | 10 | 10 | 10 | 10 | 10 | 10 | 10 |
| Widthwise groove | Groove width (mm) | 10 | 10 | 10 | 10 | 10 | 10 | 10 |
|  | Groove depth Tread center portion (%) | 100% | 100% | 100% | 100% | 100% | 100% | 100% |
|  | Tread middle portion (%) | 100% | 100% | 100% | 100% | 100% | 100% | 100% |
|  | Tread shoulder portion (%) | 60% | 100% | 100% | 100% | 100% | 60% | 100% |
|  | Position in circumferential direction | Center position of ground contact surface region | Center position of ground contact surface region | Center position of ground contact surface region | Beyond the required range at tire equatorial plane position *1 | Beyond the required range at ⅛, ¼ and ⅜ positions *2 | Center position of ground contact surface region | Center position of ground contact surface region |
|  | Inner end in tread width direction | 1/16 | 0 | 0 | 0 | 0 | 1/16 | 0 |
|  | Outer end in tread width direction | At shoulder circumferential groove *3 | ⅜ | On the inner side than shoulder circumferential groove *4 | ⅜ | ⅜ | ⅜ | ⅜ |
| Shoulder circumferential groove | Groove width | Closed | — | Closed | Closed | Closed | Closed | Closed |

In Table 1, groove depths in the tread center, the tread middle, and the tread shoulder portions of a widthwise groove represent ratios (%) with respect to a groove depth of the lug groove, respectively.

"Inner end in tread width direction" and "Outer end in tread width direction" of the widthwise groove among the detailed characteristics shown in Table 1 represent positions of the inner end and the outer end in the tread width direction of the widthwise groove, respectively, and each numerical value represents a ratio of the distance measured from the tire equatorial plane to each position, with respect to the tread width. For example, the numerical value "0" shown in Table 1 represents that the (inner) end of the widthwise groove is positioned on the tire equatorial plane and the numerical value "⅜" represents that the (outer) end of the widthwise groove is positioned at the end of a ground contact surface of the tread, i.e. opens on the outer side in the tread direction at the end of a ground contact surface of the tread.

"Closed" in Table 1 represents that the groove has a groove width narrow enough to be closed when the groove is in contact with the ground in a ground contact portion of the tire. "Not closed" in Table 1 represents that the groove has a groove width not to be closed when the groove is in contact with the ground in a ground contact portion of the tire.

"Beyond the required range at tire equatorial plane position *1" in Table 1 represents that the widthwise grooves are formed in the tread circumferential direction in each ground contact surface region such that, at the tire equatorial plane position, the widthwise grooves are located beyond ±30% of the tread circumferential length of the ground contact surface region at the tire equatorial plane position, measured from the center position in the tread circumferential direction of the ground contact surface region at the tire equatorial plane position. "Beyond the required range at ⅛, ¼, and ⅜ positions *2" in Table 1 represents that the widthwise groove is formed in terms of its position in the tread circumferential direction in each ground contact surface region such that: at the ⅛ position, the widthwise groove is located beyond ±25% of the tread circumferential length of the ground contact surface region at the ⅛ position, measured from the center position in the tread circumferential direction of the ground contact surface region at the ⅛ position; at the ¼ position, the widthwise groove is located beyond ±20% of the tread circumferential length of the ground contact surface region at the ¼ position, measured from the center position in the tread circumferential direction of the ground contact surface region at the ¼ position; and at the ⅜ position, the widthwise groove is located beyond ±20% of the tread circumferential length of the ground contact surface region at the ⅜ position, measured from the center position in the tread circumferential direction of the ground contact surface region at the ⅜ position. "At shoulder circumferential groove *3" in Table 1 represents that the outer end in the tread width direction of the widthwise groove opens to the shoulder circumferential groove. "On the inner side than shoulder circumferential groove *4" in Table 1 represents that the outer end in the tread width direction of the widthwise groove is positioned on the inner side in the tread width direction than the shoulder circumferential groove.

Each of the test tires, assembled with an application rim prescribed by TRA and inflated at the normal internal pressure, was mounted on a front wheel of a vehicle, made to run 48,000 km (30,000 mile), then mounted on a rear wheel of the vehicle and made to run 48,000 km (30,000 mile) again. Amounts of wear of the test tire were measured at the respective stages of the test and wear resistance when mounted on a front wheel, wear resistance when mounted on a rear wheel, and the total wear resistant life of the test tire were calculated as percentage, respectively, for evaluation. The results are shown in Table 2. Regarding the values shown in Table 2, the larger value represents the better wear resistance properties.

Further, each of the test tires was mounted on a front wheel of a vehicle, made to run for 24 hours, and then temperature in the tread portion thereof was measured. The temperature measurement was made by using temperature measuring probes at five positions, i.e. the tire equatorial plane position, the two 1⁄8 positions and the two 1⁄4 positions on the respective sides on the tire equatorial plane, at a depth which was 3.5 mm on the outer side in the tire radial direction of the belt, respectively. Temperature was measured at the center position in the tread circumferential direction of a land portion demarcated by two widthwise grooves adjacent to each other in the tread circumferential direction. The average of the values measured at the aforementioned five positions are expressed as an index value for each test tire in Table 2. The smaller index value represents the lower temperature thus the better heat-dissipating properties in Table 2.

4, 34, 54: Ground contact surface of tread
4a: Tread rubber
5, 35, 55: Center circumferential groove
6, 36, 56: Lug groove
7, 37, 57: Communication groove
8, 38: Ground contact surface region
9, 59: Shoulder circumferential groove
39: Circumferential intermittent groove
10, 11, 60, 61: Block
12, 22, 42, 62: Widthwise groove
12a, 42a, 62a: Outer end in tread width direction of widthwise groove
13: Tread portion
14: Sidewall portion
15: Bead portion
15a: Bead core
C: Tire equatorial plane
E: End of ground contact surface of tread
Wt: Tread width
L1, L2, L3: Tread circumferential lengths of ground contact surface region at respective tread widthwise positions
C1, C2, C3: Center position in tread circumferential direction of ground contact surface region at respective tread widthwise positions

TABLE 2

|  |  | Comp. Example 1 | Comp. Example 2 | Example 1 | Example 2 | Example 3 | Example 4 | Example 5 | Example 6 |
|---|---|---|---|---|---|---|---|---|---|
| Wear resistance properties | At front wheel | 100 | 100 | 100 | 100 | 85 | 90 | 85 | 95 |
|  | At rear wheel | 100 | 100 | 100 | 100 | 95 | 95 | 95 | 98 |
|  | Total wear resistant life | 100 | 100 | 100 | 100 | 92 | 93 | 92 | 97 |
| Temperature in tread portion (index) |  | 100 | 98 | 90 | 88 | 88 | 88 | 88 | 88 |

|  |  | Example 7 | Example 8 | Example 9 | Example 10 | Example 11 | Example 12 | Example 13 |
|---|---|---|---|---|---|---|---|---|
| Wear resistance properties | At front wheel | 100 | 90 | 100 | 80 | 70 | 100 | 100 |
|  | At rear wheel | 100 | 100 | 100 | 100 | 100 | 100 | 100 |
|  | Total wear resistant life | 100 | 97 | 100 | 93 | 90 | 100 | 100 |
| Temperature in tread portion (index) |  | 0 | 88 | 88 | 96 | 97 | 90 | 90 |

It is understood from the results shown in Table 2 that the test tires of Examples 1-13, each having a widthwise groove in a ground contact surface region thereof, exhibit lower temperature of the tread portion, as compared with the test tires of Comparative Examples 1, 2 each having no widthwise groove in a ground contact surface region thereof. Further, it is understood that the test tires of Examples 1, 2, 6-9, 12 and 13 exhibit lower temperature of the tread portion without deteriorating wear resistance thereof so much, as compared with the test tires of Comparative Examples 1, 2 each having no widthwise groove in a ground contact surface region thereof.

Accordingly, it is reasonably concluded that our pneumatic tire can reduce a temperature rise in the central region, generating a large amount of heat when the tire is used, of a tread portion thereof satisfactorily low all across the central region.

REFERENCE SIGNS LIST

1, 31, 51: Pneumatic tire
2: Carcass
3: Belt
3a, 3b, . . . 3f: First belt layer, Second belt layer, Sixth belt layer
3g, 3h, 3i: Inner intersecting belt group, Intermediate intersecting belt group, outer intersecting belt group
Pc: Tread center portion
Pm: Tread middle portion
Ps: Tread shoulder portion
OD: Tire outer diameter
DC: Rubber gauge

The invention claimed is:

1. A pneumatic tire, comprising:
a plurality of lug grooves, each lug groove opening at an end of a ground contact surface of a tread portion and extending toward the tire equatorial plane of the ground contact surface of the tread portion to terminate before reaching the tire equatorial plane;
a plurality of communication grooves, each communication groove making a corresponding pair of the lug grooves located on respective sides of the tire equatorial plane communicate with each other;
at least one widthwise groove, formed in a ground contact surface region demarcated between the end of the ground contact surface and the tire equatorial plane and between one pair and another pair adjacent thereto in the tread circumferential direction of the lug grooves and the communication groove communicating therewith, such that the widthwise groove extends in a direction of a tread width and an end thereof on the outer side in the tread width direction terminates within the ground contact surface region;

a center circumferential groove continuously extending in the tread circumferential direction on the tire equatorial plane and communicating with the communication grooves; and a plurality of shoulder circumferential grooves formed on respective sides of the tire equatorial plane to each continuously extend in the tread circumferential direction to intersect the lug grooves and demarcate the ground contact surface region between the circumferentially adjacent pairs of the lug grooves and the communication grooves into a tire widthwise inner side block and a tire widthwise outer side block, wherein:

an inner end in the tread width direction of the widthwise groove terminates in the ground contact surface region without opening to the center circumferential groove, each widthwise groove extends to intersect the corresponding shoulder circumferential groove, the tire widthwise inner side block is larger than the tire widthwise outer side block in length in the tread width direction thereof, and provided that a tread portion between the tire equatorial plane and a position distanced by ⅛ of the tread width on the outer side in the tread width direction from the tire equatorial plane represents a tread center portion, a tread portion between the ⅛ position and a position distanced by ¼ of the tread width on the outer side in the tread width direction from the tire equatorial plane represents a tread middle portion, and a tread portion between the ¼ position and a position distanced by ⅜ of the tread width on the outer side in the tread width direction from the tire equatorial plane represents a tread shoulder portion, a groove depth of the widthwise groove is: in the range of 40% to 110% of the lug groove depth in the tread center portion; in the range of 40% to 110% of the lug groove depth in the tread middle portion; and in the range of 40% to 90% of the lug groove depth in the tread shoulder portion.

2. The pneumatic tire of claim 1, wherein the widthwise groove has a groove width narrow enough to be closed when the groove is in contact with the ground in a ground contact portion of the tire.

3. The pneumatic tire of claim 1, wherein the center circumferential groove has a groove width narrow enough to be closed when the groove is in contact with the ground in a ground contact portion of the tire.

4. The pneumatic tire of claim 1, wherein each communication groove has a groove width narrow enough to be closed when the groove is in contact with the ground in a ground contact portion of the tire.

5. The pneumatic tire of claim 1, wherein each shoulder circumferential groove has a groove width narrow enough to be closed when the groove is in contact with the ground in a ground contact portion of the tire.

6. The pneumatic tire of claim 1, wherein the at least one widthwise groove includes a plurality of widthwise grooves that are formed in the tread circumferential direction in each ground contact surface region such that, at the tire equatorial plane position, the widthwise grooves are located within ±30% of the tread circumferential length of the ground contact surface region at the tire equatorial plane position, measured from the center position in the tread circumferential direction of the ground contact surface region at the tire equatorial plane position.

7. The pneumatic tire of claim 1, wherein the widthwise groove is formed in terms of its position in the tread circumferential direction in each ground contact surface region such that:

at a position distanced by ⅛ of the tread width on the outer side in the tread width direction from the tire equatorial plane, the widthwise groove is located within ±25% of the tread circumferential length of the ground contact surface region at the ⅛ position, measured from the center position in the tread circumferential direction of the ground contact surface region at the ⅛ position;

at a position distanced by ¼ of the tread width on the outer side in the tread width direction from the tire equatorial plane, the widthwise groove is located within ±20% of the tread circumferential length of the ground contact surface region at the ¼ position, measured from the center position in the tread circumferential direction of the ground contact surface region at the ¼ position; and at a position distanced by ⅜ of the tread width on the outer side in the tread width direction from the tire equatorial plane, the widthwise groove is located within ±20% of the tread circumferential length of the ground contact surface region at the ⅜ position, measured from the center position in the tread circumferential direction of the ground contact surface region at the ⅜ position.

8. The pneumatic tire of claim 1, wherein the outer end in the tread width direction of the widthwise groove is located on the outer side in the tread width direction than the ¼ position and on the inner side in the tread width direction than the ⅜ position.

* * * * *